United States Patent [19]
Kondo

[11] Patent Number: 5,379,072
[45] Date of Patent: Jan. 3, 1995

[54] DIGITAL VIDEO SIGNAL RESOLUTION CONVERTING APPARATUS USING AN AVERAGE OF BLOCKS OF A TRAINING SIGNAL

[75] Inventor: Tetsujiro Kondo, Kanagawa, Japan

[73] Assignee: Sony Corporation, Tokyo, Japan

[21] Appl. No.: 986,707

[22] Filed: Dec. 8, 1992

[30] Foreign Application Priority Data

Dec. 13, 1991 [JP] Japan .................. 3-352300

[51] Int. Cl.$^6$ .............................................. H04N 5/14
[52] U.S. Cl. ................................... 348/441; 348/454
[58] Field of Search .............. 358/140, 166, 11, 37, 358/133; H04N 5/14, 5/21; 382/14, 15; 348/441, 442, 443, 445, 453, 454

[56] References Cited

U.S. PATENT DOCUMENTS

| 4,442,454 | 4/1984 | Powell | 358/167 |
| 4,845,560 | 7/1989 | Kondo et al. | 358/133 |
| 5,113,256 | 5/1992 | Citta et al. | 358/133 |
| 5,138,448 | 8/1992 | Gillies et al. | |
| 5,161,014 | 11/1992 | Pearson et al. | 358/160 |

FOREIGN PATENT DOCUMENTS

0414596 2/1991 European Pat. Off. .

OTHER PUBLICATIONS

SMPTE Journal vol. 98, No. 6, Jun. 1989, Scarsdale, N.Y., US pp. 420–424 P. Robert et al. 'Advanced High Definition 50 to 60 Hz Standards Conversion'.
Signal Processing of HDTV, II 30 Aug. 1989, Turin (II) pp. 665–673, XP215284 M. Sakurai 'NTSC-HDTV Up-Converter'.

*Primary Examiner*—Victor R. Kostak
*Assistant Examiner*—Nathan J. Flynn
*Attorney, Agent, or Firm*—William S. Frommer; Alvin Sinderbrand

[57] ABSTRACT

A digital video signal converting apparatus for converting a first digital video signal having a first resolution to a second digital video signal having a second resolution higher than the first resolution, comprises; block segmentation circuit for converting the first digital video signal into a block format, memory having a mapping table stored therein and having address terminals to which the first digital video signal in a block format is supplied and output terminals from which the second digital video signal in block format is output, and block separation circuit for converting the second digital video signal in a block format into a digital video signal in a raster scan order, wherein the mapping table in the memory is generated by training utilizing a plurality of images the training step being performed by generating first and second digital video signal corresponding to each of the plurality of images, converting each of the first and second digital video signals into a block format, and selecting the first digital video signal in a block format is an address signal for the mapping table and inputting the second digital video signal in a block format to a memory area corresponding to the address, and generating data of the mapping table from the signal stored in the memory area.

10 Claims, 6 Drawing Sheets

DIGITAL VIDEO SIGNAL RESOLUTION CONVERTING APPARATUS USING AN AVERAGE OF BLOCKS OF A TRAINING SIGNAL

BACKGROUND OF THE INVENTION

1. Field of the Invention

The present invention relates to an image converting apparatus which can compensate a resolution and which can be applied to, for example, an up conversion for converting a television signal of a standard resolution into a television signal of a high resolution.

2. Description of the Prior Art

Data of pixels which lack is compensated by an interpolation filter in an up conversion for converting an image of a standard resolution or a low resolution (they are abbreviated to SD) into an image of a high resolution (abbreviated to HD), an electronic zoom, or an enlargement of an image.

Figure 1:
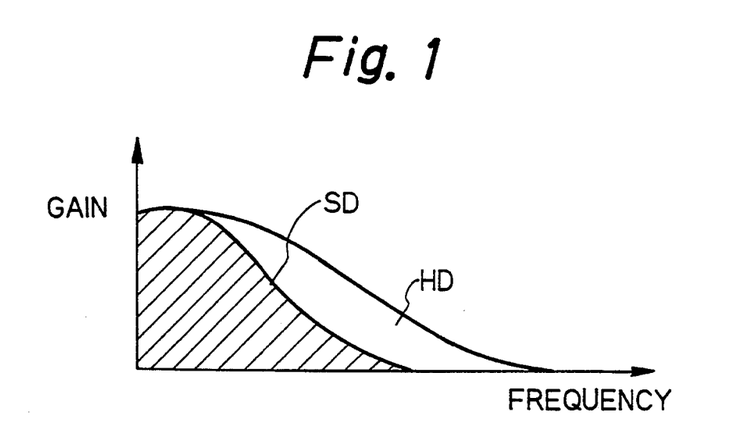
FIG. 1 is a schematic diagram to explain a prior art.

However, there is a problem such that a resolution of the output image obtained by the interpolation by the filter deteriorates. For example, a hatched portion shown in FIG. 1 is a region of a video signal of SD. Even when a television signal of HD is formed by interpolating the video signal by the filter, an HD component (high frequency component) which doesn't exist in the input SD signal is not produced. Consequently, the resolution of the output image is not as good as it could be.

OBJECTS AND SUMMARY OF THE INVENTION

It is, therefore, an object of the invention to provide an image converting apparatus which can reconstruct a high resolution component and can compensate a resolution.

According to an aspect of the present invention, there is provided a digital video signal converting apparatus for converting a first digital video signal having a first resolution to a second digital video signal having a second resolution higher than the first resolution, comprising:

block segmentation means for converting the first digital video signal into a block format, memory means having a mapping table stored therein and having address terminals to which the first digital video signal in a block format is supplied and output terminals from which the second digital video signal in block format is output, and block separation means for converting the second digital video signal in a block format into a digital video signal in a raster scan order, wherein the mapping table in the memory means is generated by training utilizing a plurality of pictures the training step being performed by generating first and second digital video signal corresponding to each of the plurality of pictures, converting each of the first and second digital video signals into a block format, and selecting the first digital video signal in a block format is an address signal for the mapping table and inputting the second digital video signal in a block format to a memory area corresponding to the address, and generating data of the mapping table from the signal stored in the memory area.

The mapping table is formed so as to indicate the correlation between two image signals by using original images of various picture patterns for training. Therefore, a high resolution component which is not included in the input image signal can be reconstructed by the mapping table.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 2:
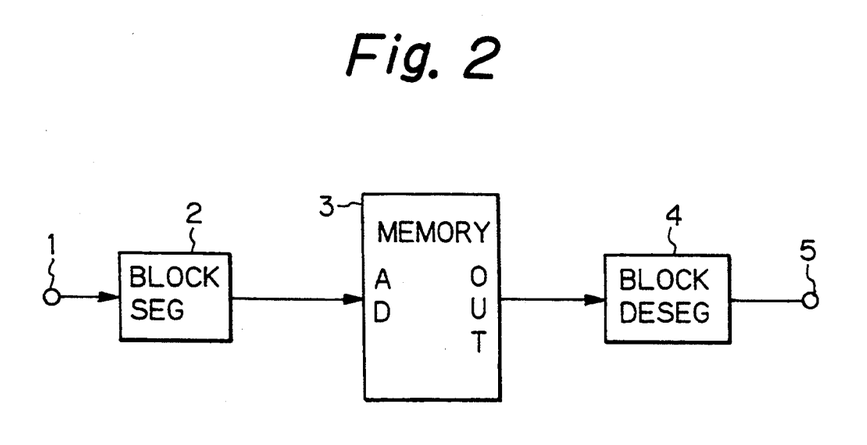
FIG. 2 is a block diagram showing a construction of an embodiment of the invention.

An embodiment of the invention will be explained hereinbelow. The embodiment relates to an example in which an SD video signal is up converted into an HD video signal. In FIG. 2, a digital SD video signal is supplied to an input terminal shown by reference numeral 1. As an example of the SD video signal, there is a reproduction signal of SDVTR, a broadcasting signal, or the like. The SD video signal is converted from an order of an ordinary raster scan to an order of blocks by a block segmentation circuit 2.

Figure 3:
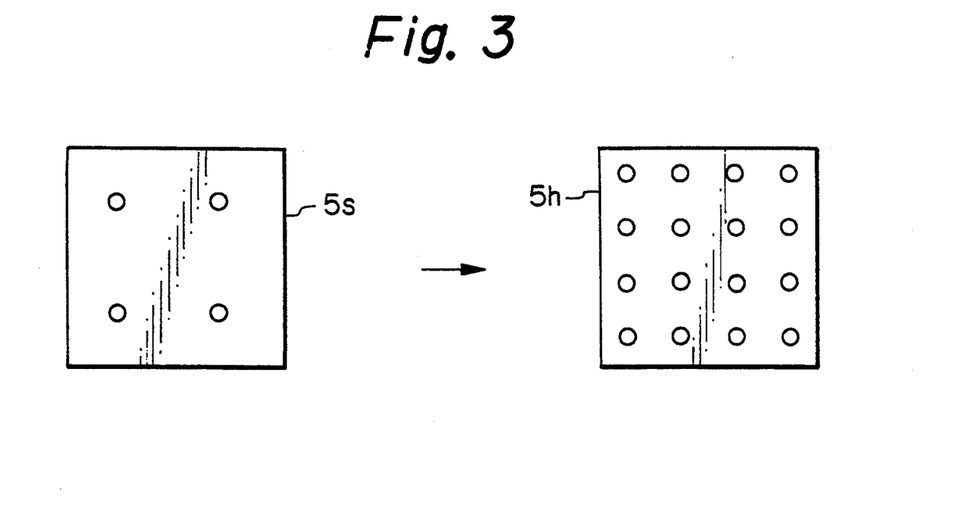
FIG. 3 is a schematic diagram to explain a block construction.

As shown in FIG. 3, a video signal converted into a block $5s$ of $(2 \times 2 \times 8$ bits$=32$ bits$)$ is generated as an output of the block segmentation circuit 2. The signal of 32 bits is supplied to a memory 3 as addresses. A mapping table based on the correlation between the SD image and the HD image has been stored into the memory 3 as will be explained hereinlater. The memory 3 is constructed by, for example, a non-volatile RAM.

A video signal of a block $5h$ of $(4 \times 4 \times 8$ bits$)$ is read out from the memory 3 as shown in FIG. 3. The position of the block $5h$ which occupies in one picture plane (one field or one frame) is equal to that of the block $5s$ of the input image. More practically speaking, since an aspect ratio of a monitor for HD to which an output image is supplied is set to (16:9), the output block $5h$ corresponding to, for example, the block $5s$ at the left upper corner of the input image is used as an upper image block on the inner side than the left upper corner. Even when the output image obtained from the SD image of an aspect ratio of (4:3) is supplied to the monitor for HD, therefore, information on both sides of the picture plane of the monitor lacks. The lack information on both of the right and left sides can be set to blanking portions or can be also interpolated. Since the above processing is not directly concerned with the spirit of the invention, however, its detailed description is omitted.

Output image data read out from the memory 3 is supplied to a block separating circuit 4 and the order of the data is converted into the order of the raster scan. Output image data from the block separating circuit 4 is taken out to an output terminal 5. The monitor for HD is connected to the output terminal 5 through a D/A converter (not shown). The number of pixels of the output image is 4 times as large as the number of pixels of the input SD video signal and the HD image can be reproduced by the monitor for HD.

Figure 4:
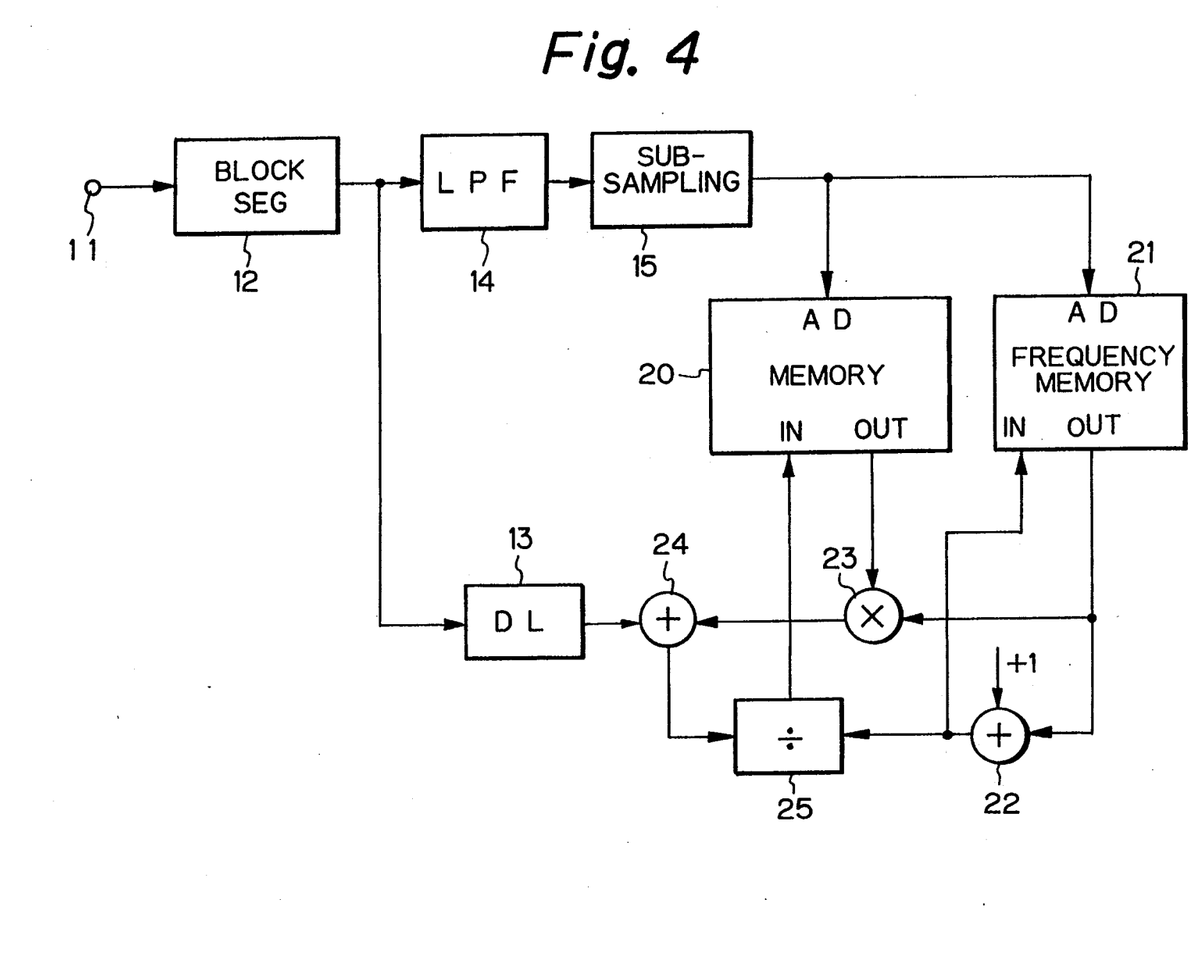
FIG. 4 is a block diagram of an example of a construction to form a mapping table.

An example of a construction to make the mapping table which is stored in the memory 3 is shown in FIG. 4. In FIG. 4, a digital HD video signal is supplied to an input terminal shown by reference numeral 11. It is desirable that the HD video signal is a standard signal in consideration of the formation of the mapping table. For example, a signal comprising still images of various picture patterns can be used. The HD video signal can be actually obtained by photographing a standard image by an HD video camera or by recording an image pickup signal into an HDVTR. Further, when the HD video signal to be derived as a conversion output has previously been known, generality is not requested. Therefore, the mapping table is formed by using an original HD video signal.

The HD video signal is supplied to a block segmentation circuit 12. The block segmentation circuit 12 converts the video signal of the order of the raster scan into the structure of the blocks of $(4 \times 4 \times 8$ bits). Two signals having different resolution are formed from an output signal of the block segmentation circuit 12. One of the two signals is a signal having the same resolution as that of the original HD video signal and is obtained as an output of a delay circuit 13. Another signal is an SD video signal and is formed by a low pass filter 14 and a sub-sampling circuit 15. The low pass filter 14 is a two-dimensional digital filter and executes a band limit in the horizontal and vertical directions in order to prevent an aliasing distortion. The sub-sampling circuit 15 performs the sampling such that the numbers of pixels in the horizontal and vertical directions are reduced into ½, respectively. Therefore, one block of the SD video signal from the sub-sampling circuit 15 corresponds to the data of $(2 \times 2 \times 8$ bits $= 32$ bits).

The SD video signal from the sub-sampling circuit 15 is supplied to a memory 20 and a frequency memory 21 as their addresses. The memory 20 has address spaces of $2^{32}$ and data of $(4 \times 4 \times 8$ bits $= 128$ bits) is written into those addresses. Although the frequency memory 21 also has the same address space as that of the memory 20, a frequency is written as data into the respective address. That is, read-out output of the memory 21 is supplied to an adder 22 and is increased by $+1$ and an output of the adder 22 is written to the same address in the memory 21. The contents of the addresses in the memories 20 and 21 are cleared to zero as initial states.

The data of 128 bits read out from the memory 20 is supplied to a multiplier 23 and is multiplied to a frequency read out from the frequency memory 21. An output of the multiplier 23 is supplied to an adder 24 and is added to input data from the delay circuit 13 by the adder 24. An output of the adder 24 is supplied to a divider 25 as a dividend. The output of the adder 22 is supplied to the divider 25 as a divisor. An output (quotient) of the divider 25 is used as input data of the memory 20.

In the construction of FIG. 4 mentioned above, when a certain address Ai corresponding to one block of the SD video signal is first accessed, since the read-out outputs of the memories 20 and 21 are equal to 0, data X1 of one block of the HD video signal is directly written into the memory 20 and a value in the corresponding address in the memory 21 is set to 1. When this address is again accessed after that, the output of the adder 22 is equal to 2 and the output of the adder 24 is equal to (X1+X2) (X2 is the output of the delay circuit 13). Therefore, the output of the divider 25 is equal to (X1+X2)/2 and is written into the memory 20. On the other hand, a frequency 2 is written into the frequency 21. Further, when the above address is after that, the data in the memory 20 is updated to (X1+X2+X3)/3 and the frequency is also updated to 3 by operations similar to the above.

By executing the operations mentioned above for a predetermined period of time, a mapping table indicative of the correlation between the block of the HD video signal and the block of the SD video signal which were formed from the same video signal is stored into the memory 20. In other words, when a pattern of the data of the block of the SD video signal is given, a mapping table which generates the pattern of the block of the HD video signal which can correspond to such a pattern as an average can be formed. This mapping table is stored into memory 3 of the construction of FIG. 2.

Next, the second embodiment of the invention will now be explained. The embodiment relates to an example in which a video signal of 25 frames per second such as PAL system i.e., video signal having low resolution in time-base direction (hereinlater, referred to as an SD video signal) is converted into a video signal of 30 frames per second such as NTSC system i.e., video signal having high resolution in time-base direction (hereinbelow, referred to as an HD video signal). In the case of this example in FIG. 2 mentioned above, a digital SD video signal is supplied to an input terminal shown by reference numeral 1. As an example of the SD video signal, there is a reproduction signal of SDVTR, a broadcasting signal, or the like. The SD video signal is converted from an order of an ordinary raster scan to an order of blocks by a block segmentation circuit 2.

Figure 5:
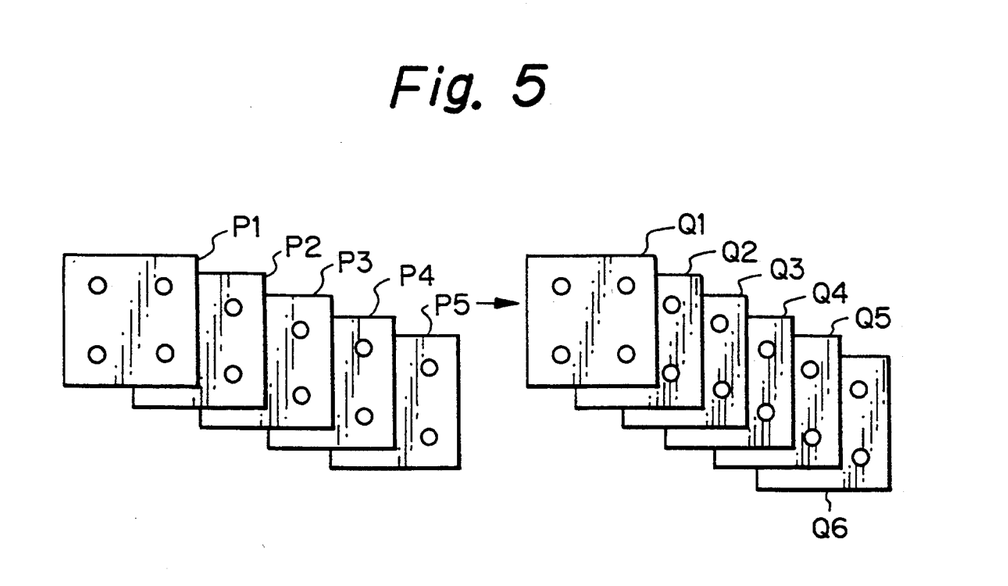
FIG. 5 is a schematic diagram to explain a block construction of another embodiment of the invention.

As shown in FIG. 5, a video signal converted into a three-dimensional block comprising areas P1 to P5 obtained by extracting the same portions of successive five frames, and each area includes $(2 \times 2 \times 8$ bits $= 32$ bits) is generated as an output of the block segmentation circuit 2. The signal of $(32 \times 5 = 160$ bits) is supplied to a memory 3 as addresses. A mapping table based on the correlation between the SD image and the HD image has been stored into the memory 3 as will be explained hereinlater.

A video signal containing areas Q1 to Q6 of $(2 \times 2 \times 8$ bits) and each area occupies the same portions in successive six frames is read out from the memory 3 as shown in FIG. 5. In other words, an input signal of five frames is converted into an output signal of six frames. The position of each area of three-dimensional blocks of the output image is equal to that of each area of three-dimensional blocks of input image.

Output image data read out from the memory 3 is supplied to a block separating circuit 4 and the order of the data is converted into the order of the raster scan. Output image data from the block separating circuit 4 is taken out to an output terminal 5. The monitor is connected to the output terminal 5 through a D/A converter (not shown). Since the output image is converted into 30 frames per second, the image can be reproduced by the monitor for NTSC.

Figure 6:
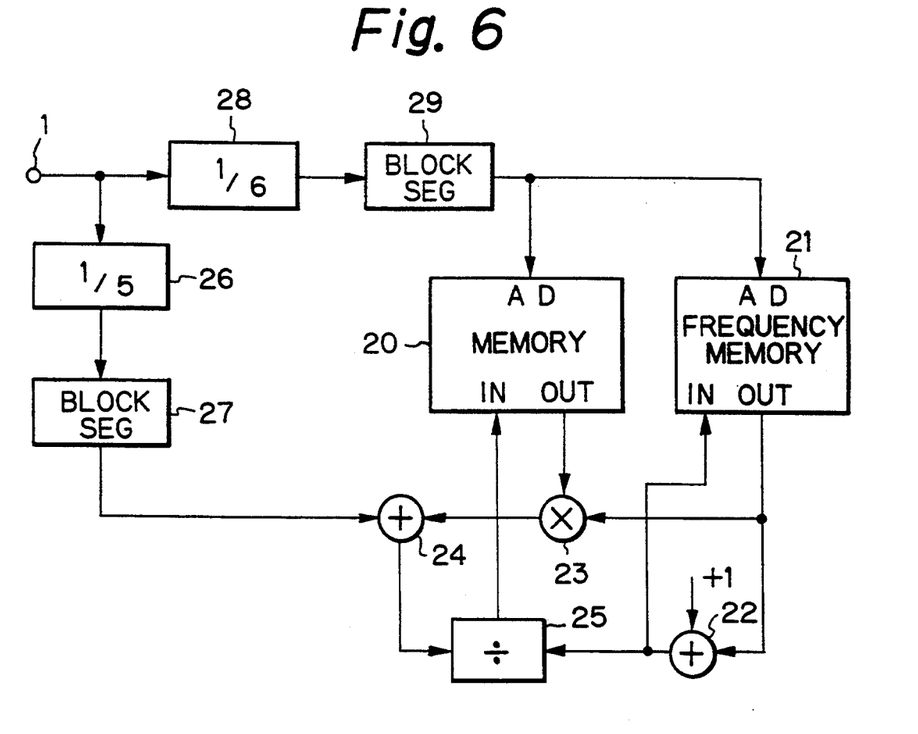
FIG. 6 is a block diagram of an example of a construction to form a mapping table of another embodiment of the invention.

An example of a construction to make the mapping table which is stored in the memory 3 is shown in FIG. 6. In FIG. 6, a digital video signal of 150 frames per second is supplied to an input terminal indicated at reference numeral 11. The 150 frames is the least common multiplied number of 25 frames and 30 frames. It is desirable that the input video signal is a standard signal in consideration of the formation of the mapping table.

The input video signal is supplied to thinning-out circuits 26 and 28. The thinning-out circuit 26 forms a video signal of 30 frames per second by thinning out the input video signal to 1/5 in the time direction. The thinning-out circuit 28 forms a video signal of 25 frames per second. The output video signals of the thinning-out circuits 26 and 28 are supplied to block segmentation circuits 27 and 29, respectively. The block segmentation circuit 27 converts the video signal of the order of the raster scan into the structure of the three-dimensional blocks of (2×2×6 flames). The block segmentation circuit 29 converts the video signal of the order of the raster scan into the structure of the three-dimensional blocks of (2×2×5 frames).

The output video signal from the block segmentation circuit 29 is supplied to a memory 20 and a frequency memory 21 as their addresses. The memory 20 has address spaces of $2^{160}$ and data of (2×2×6×8 bits=192 bits) is written into those addresses. Although the frequency memory 21 also has the same address space as that of the memory 20, a frequency is written as data into the respective address. That is, read-out output of the memory 21 is supplied to an adder 22 and is increased by +1 and an output of the adder 22 is written to the same address in the memory 21. The contents of the addresses in the memories 20 and 21 are cleared to zero as initial states.

The data of 192 bits read out from the memory 20 is supplied to a multiplier 23 and is multiplied to a frequency read out from the frequency memory 21. An output of the multiplier 23 is supplied to an adder 24 and is added to input data from the block segmentation circuit 27 by the adder 24. An output of the adder 24 is supplied to a divider 25 as a dividend. The output of the adder 22 is supplied to the divider 25 as a divisor. An output (quotient) of the divider 25 is used as input data of the memory 20.

In the construction of FIG. 6 mentioned above, when a certain address Ai corresponding to one block of the SD video signal is first accessed, since the read-out outputs of the memories 20 and 21 are equal to 0, data X1 of one block of the HD video signal is directly written into the memory 20 and a value in the corresponding address in the memory 21 is set to 1. When this address is again accessed after that, the output of the adder 22 is equal to 2 and the output of the adder 24 is equal to (X1+X2) (X2 is the output of the delay circuit 13). Therefore, the output of the divider 25 is equal to (X1+X2)/2 and is written into the memory 20. On the other hand, a frequency 2 is written into the frequency 21. Further, when the above address is after that, the data in the memory 20 is updated to (X1+X2+X3)/3 and the frequency is also updated to 3 by operations similar to the above.

By executing the operations mentioned above for a predetermined period of time, a mapping table indicative of the correlation between the block of the HD video signal and the block of the SD video signal which were formed from the same video signal is stored into the memory 20. In other words, when a pattern of the data of the block of the SD video signal is given, a mapping table which generates the pattern of the block of the HD video signal which can correspond to such a pattern as an average can be formed. This mapping table is stored into memory 3 of the construction of FIG. 3.

Figure 7:
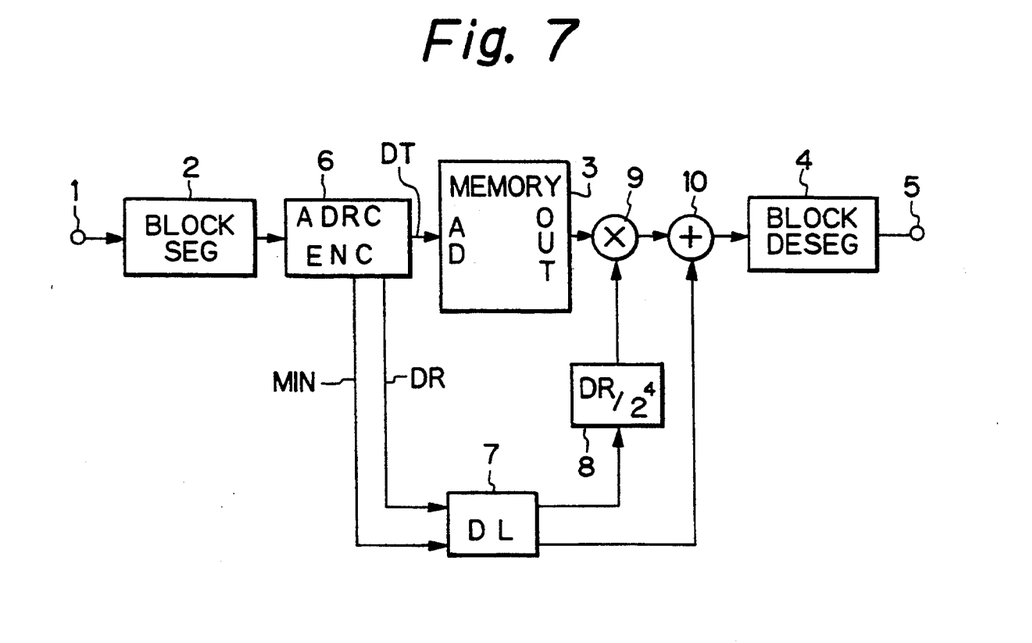
FIG. 7 is a block diagram showing a construction of still another embodiment of the invention.

FIG. 7 shows still another embodiment of the present invention. This embodiment intends to reduce the capacity of the memory for formation and storage of the mapping table. The three-dimensional ADRC encoder 6 is added to the output of the block segmentation circuit 2. ADRC (Adaptive Dynamic Range Coding) is proposed by the present applicant. In ADRC, the bit number of each pixel is compressed from 8 bits to, for example, 4 bits by using the fact that plural pixels in a block have the time and spatial correlation.

The ADRC encoder 6 comprises: a circuit for detecting a maximum value MAX, a minimum value MIN and a dynamic range DR represented with (MAX−MIN=DR) of pixel data of block, a circuit for generating a quantizing step by equally dividing the dynamic range DR by $2^4$, a subtracter for normalizing the pixel data of block by subtracting the minimum value MIN from the pixel data, and a quantizing circuit for dividing an output of the subtracter by the quantizing step i.e., requantizing. The dynamic range DR per block, the minimum value MIN and the four-bit code signal DT corresponding to each pixel are output from the ADRC encoder 6.

The code signal DT of the output signals from the ADRC encoder 6 is supplied to the memory 3 as the addresses. The video signal that frame number has been converted in accordance with the mapping table is read out from the memory 3. The dynamic range DR and the minimum value MIN of encoded outputs from the ADRC encoder 6 are supplied to a delay circuit 7. The dynamic range DR of the output of the delay circuit 7 is fed to a divider 8, and divided by $2^4=16$. Thus, the quantizing step of the block is obtained by the divider 8.

The code signal of the block of the output image signal which is read out from the memory 3 is supplied to a multiplier 9. Since the quantizing step is fed to the multiplier 9, the data after removing the minimum value is restored at the multiplier 9. The output signal of the multiplier 9 is supplied to an adder 10, and the minimum value MIN from the delay circuit 7 is added. As a result, the restored data is fed to a block separation circuit 4, and order of data is converted into the order of the raster scan. The output image data from the block separation circuit is taken out to an output terminal 5.

Since the example of the embodiment shown in FIG. 7 compresses the data per block by ADRC, the capacity of the memory 3 can be reduced. In addition, the process for forming the mapping table is the same as the above except that the correlation between the ADRC encoded signals are detected. Thus, the capacity of the memory 3 for forming the mapping table can be reduced. The embodiment in FIG. 7 can be similarly applied to a conversion for improving the spatial resolution in FIG. 3.

Figure 8:
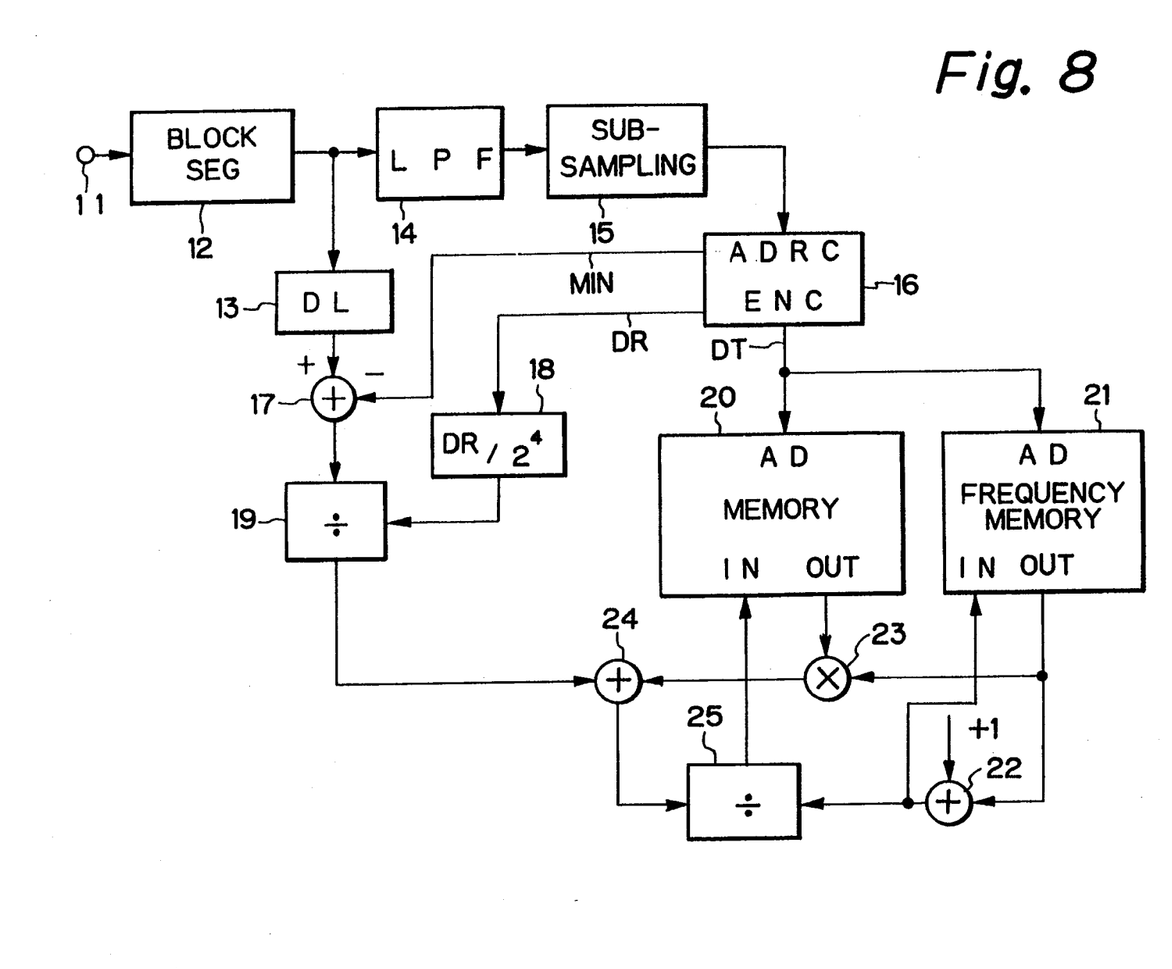
FIG. 8 is a block diagram of an example of a construction to form a mapping table of the embodiment in FIG. 7.

FIG. 8 shows an example of a construction to form the mapping table which is stored in the memory 3 in FIG. 7, when the embodiment in FIG. 7 is applied for improving the spatial resolution. In FIG. 8, a digital HD video signal is supplied to an input terminal shown by reference numeral 11. It is desirable that the HD video signal is a standard signal in consideration of the formation of the mapping table. For example, a signal comprising still images of various picture patterns can be used. The HD video signal can be actually obtained by photographing a standard image by an HD video camera or by recording an image pickup signal into an HDVTR. Further, when the HD video signal to be derived as a conversion output has previously been known, generality is not requested. Therefore, the mapping table is formed by using an original HD video signal.

The HD video signal is supplied to a block segmentation circuit 12. The block segmentation circuit 12 converts the video signal of the order of the raster scan into the structure, of the blocks of (4×4×8 bits). Two signals having different resolution and encoded by ADRC are formed from an output signal of the block segmentation circuit 12. One of the two signals is a signal removing and requantizing the same resolution as that of the original HD video signal and is formed by the delay circuit 13, subtracter 17, dividers 18 and 19. The minimum value MIN is supplied to the subtractor 17 from ADRC encoder 16. A quantizing step formed at the divider 18 is supplied to the divider 19. As a result, a data of one pixel which is compressed into 4 bits is obtained.

The other signal is an SD video signal and is formed by a low pass filter 14 and a sub-sampling circuit 15 and the signal is encoded at ADRC encoder 16. The low pass filter 14 is a two-dimensional digital filter and executes a band limit in the horizontal and vertical directions in order to prevent an aliasing distortion. The sub-sampling circuit 15 performs the sampling such that the numbers of pixels in the horizontal and vertical directions are reduced into $\frac{1}{2}$, respectively. Therefore, one block of the SD video signal from the sub-sampling circuit 15 corresponds to the data of (2×2×8 bits=32 bits). The data is compressed (2×2×4 bits=16 bits) at the ADRC encoder 16.

The code signal DT from the ADRC encoder 16 is supplied to a memory 20 and a frequency memory 21 as their addresses. The memory 20 has address spaces of $2^{16}$ and data of (4×4×4 bits=64 bits) is written into those addresses. Although the frequency memory 21 also has the same address space as that of the memory 20, a frequency is written as data into the respective address. That is, read-out output of the memory 21 is supplied to an adder 22 and is increased by +1 and an output of the adder 22 is written in the same address in the memory 21. The contents of the addresses in the memories 20 and 21 are cleared to zero as initial states.

The data of 128 bits read out from the memory 20 is supplied to a multiplier 23 and is multiplied to a frequency read out from the frequency memory 21. An output of the multiplier 23 is supplied to an adder 24 and is added to input data from the delay circuit 13 by the adder 24. An output of the adder 24 is supplied to a divider 25 as a dividend. The output of the adder 22 is supplied to the divider 25 as a divisor. An output (quotient) of the divider 25 is used as input data of the memory 20.

In the construction of FIG. 8 mentioned above, when a certain address Ai corresponding to one block of the SD video signal is first accessed, since the read-out outputs of the memories 20 and 21 are equal to 0, data X1 of one block of the HD video signal is directly written into the memory 20 and a value in the corresponding address in the memory 21 is set to 1. When this address is again accessed after that, the output of the adder 22 is equal to 2 and the output of the adder 24 is equal to (X1+X2) (X2 is the output of the delay circuit 13). Therefore, the output of the divider 25 is equal to (X1+X2)/2 and is written into the memory 20. On the other hand, a frequency 2 is written into the frequency 21. Further, when the above address is after that, the data in the memory 20 is updated to (X1+X2+X3)/3 and the frequency is also updated to 3 by operations similar to the above.

By executing the operations mentioned above for a predetermined period of time, a mapping table indicative of the correlation between the block of the HD video signal and the block of the SD video signal which were formed from the same video signal is stored into the memory 20. In other words, when a pattern of the code signal of the block of the SD video signal is given, a mapping table which generates the pattern of the code signal of the block of the HD video signal which can correspond to such a pattern as an average can be formed. This mapping table is stored into memory 3 of the construction of FIG. 7.

In the process to form the mapping table mentioned above, the data cannot be actually written into all of the addresses in the memory 20 and the addresses in which the data is equal to 0 can occur. In such a case, the interpolation is performed by the data predicted from the data which is not equal to 0 in the peripheral addresses. An example of a construction for such an interpolation is shown in FIG. 9.

Figure 9:
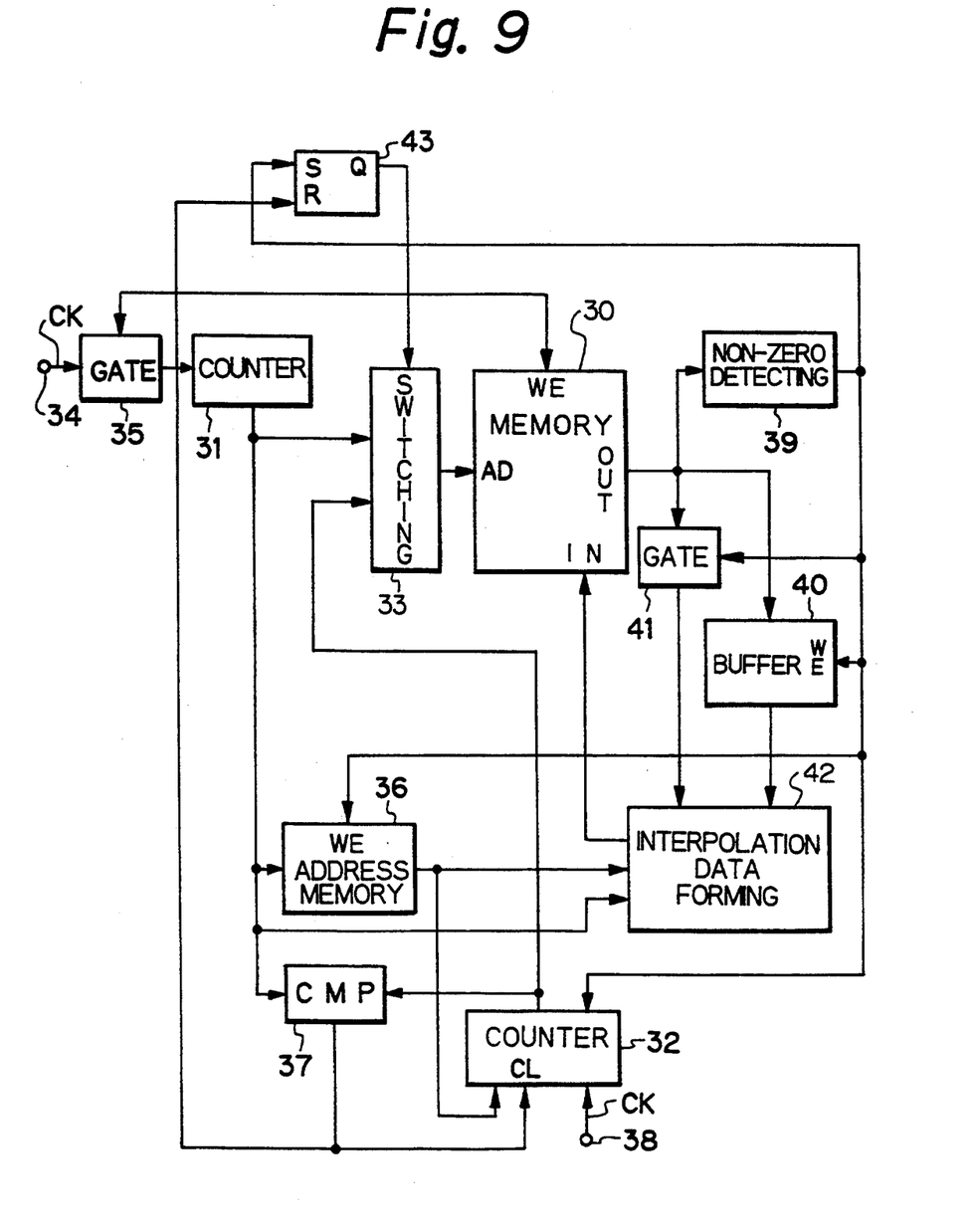
FIG. 9 is a block diagram of an example of a construction to interpolate data when a mapping table is formed.

In FIG. 9, a memory 30 is a memory in which the mapping table formed as mentioned above has been stored. One of the addresses of 32 bits from counters 31 and 32 is selectively supplied through a switching circuit 33 as an address input of the memory 30. A clock CK from an input terminal 34 is supplied to a clock input of the counter 31 through a gate circuit 35. The address from the counter 31 is supplied to the switching circuit 33, an address memory 36, and a comparing circuit 37. The clock CK from an input terminal 38 is supplied to the counter 32 and its output is supplied to the switching circuit 33 and comparing circuit 37. An output of the address memory 36 is supplied to the counter 32 as a present input.

Output data of the memory 30 is supplied to a non-zero detecting circuit 39 and a buffer memory (latch can be also used) 40 and is also supplied to an interpolation data forming circuit 42 through a gate circuit 41. The interpolation data forming circuit 42 receives an output of the buffer memory 40, an output of the gate circuit 41, an output of the counter 31, and an output of the address memory 36 and forms the interpolation data in place of the zero data. The interpolation data is set to a data input of the memory 30.

A detection signal of the non-zero detecting circuit 39 is supplied to a flip-flop 43 as a set input. The detection signal is further used to control the on/off operations of the gate circuit 41, to control the writing/reading operations of the buffer memory 40 and address memory 36, and to control the counter 32.

An output of the comparing circuit 37 to compare the outputs of the counters 31 and 32 is supplied to a clear terminal of the counter 32 and a reset terminal of the flip-flop 43. The on/off operations of the gate circuit 35, the switching operation of the switching circuit 33, and the writing operation of the memory 30 are controlled by an output signal of the flip-flop 43.

It is assumed that a part of the data stored in the memory 30 is as shown in the following table 1 in order to explain the operation of the construction of the interpolation data formation in FIG. 9 mentioned above.

TABLE 1

| Address | Data |
|---------|------|
| A0 | D0 |
| A1 | D1 |
| A2 | D2 |
| A3 | 0 |
| A4 | 0 |
| A5 | D5 |

A count value of the counter 31 is first increased by the clock CK and address signals which are sequentially generated are supplied to the memory 30 through the switching circuit 33. The read-out data from the memory 30 is supplied to the non-zero detecting circuit 39. In the case where the read-out data is not equal to 0, namely, when the data is obtained by a training image, the content on the buffer memory 40 is read out and the output of the memory 30 is newly written into the buffer memory 40. Further, the gate 41 is turned on and the output of the memory 30 is supplied to the interpolation data forming circuit 42.

When considering the timing at which data D5 in an address A5 in the memory 30 was read out as in the example mentioned above, since it is not equal to 0, preceding non-zero data D2 is read out from the buffer memory 40 by the detection signal of the non-zero detecting circuit 39. The data D5 is written into the buffer memory 40. The data D5 is supplied to the interpolation data forming circuit 42 through the gate circuit 41. The data D2 is also supplied to the interpolation data forming circuit 42.

On the other hand, since the address input to the memory 30 in this instance is equal to A5, it is written into the address memory 36 by the non-zero detection signal. An address A2 which has already been stored before is read out from the address memory 36. Those addresses A2 and A5 are supplied to the interpolation data forming circuit 42. The interpolation data to be used in place of the zero data in addresses A3 and A4 between the data D2 and D5 is formed from the data D2 and D5 with reference to the addresses A2 and A5.

A weighting mean value corresponding to a distance is formed as interpolation data in this example. That is, a distance between the addresses A2 and A5 is set to 3 and the interpolation data in the address A3 is obtained as (2 D2+D5)/3. The interpolation data in the address A4 is derived as (D2+2 D5)/3. As a forming method of the interpolation data, a curve fitting, a high-order interpolation, or the like can be used in addition to the above method.

The address A2 from the address memory 36 is loaded into the counter 32 by the non-zero detection signal. The output of the counter 32 sequentially generates the addresses A3 and A4 by the clock CK. When the output of the counter 32 reaches A5, the comparing circuit 37 generates a coincidence output. The counter 32 is cleared and the flip-flop 43 is also reset by the coincidence output.

The switching circuit 33 selects the addresses (A3, A4) from the counter 32 and the memory 30 is set into the writing mode for a period of time during which the flip-flop 43 is set. Therefore, the interpolation data (2 D2+D5)/3 and (D2+2 D5)/3 are respectively written into the addresses A3 and A4 in the memory 30. The gate circuit 35 is turned off and the increment of the counter 31 is stopped for this period of time.

For a period of time during which the flip-flop 43 is reset, the gate circuit 35 is turned on, the switching circuit 33 selects the address from the counter 31, and the memory 30 is set into the reading mode. Operations similar to those mentioned above are subsequently executed.

Although the embodiment mentioned above relates to the example in which the SD video signal is up converted into the HD video signal, the invention can be also similarly applied to the enlargement of an image in addition to the above example.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

According to the invention, since the high resolution component is reconstructed by using the correlation between the low resolution image and the high resolution image, the standard video signal is converted into the high resolution image and can be displayed on the HD monitor. The image can be also enlarged to an arbitrary size without deteriorating the resolution. The image can be, further, thinned out and compressed without a deterioration of the resolution.

What is claimed is:

1. A digital video signal converting apparatus, comprising:
    block segmentation means for segmenting a first digital video signal having a first resolution into blocks of video data,
    memory means for receiving each of said blocks of video data as respective addresses and for reading out converted data stored in a mapping table at said respective addresses, said mapping table representing a relationship between blocks of a training signal expressed in a second resolution at addresses respectively given by said blocks of said training signal expressed in said first resolution, and
    block separation means for deblocking said converted data into a second digital video signal having said second resolution.

2. A digital video signal converting apparatus according to claim 1, wherein said blocks of video data each have first and second spatial dimensions.

3. A digital video signal converting apparatus according to claim 2, wherein said first digital video signal is a signal in accordance with the NTSC standard, and said second digital video signal is a signal having a higher resolution than said first digital video signal.

4. A digital video signal converting apparatus according to claim 2, wherein said blocks of video data each also have a third temporal dimension.

5. A digital video signal converting apparatus according to claim 4, wherein said first digital video signal is a signal in accordance with the PAL standard, and said second digital video signal is a signal in accordance with the NTSC standard.

6. A digital video signal converting apparatus according to claim 1, further comprising block-compression coding means for compressing said blocks of video data, and block decoding means for decompressing said converted data.

7. A digital video signal converting apparatus according to claim 6, wherein said block compression coding means is an ADRC encoder.

8. A digital video signal converting apparatus according to claim 1, wherein said mapping table includes interpolated data in place of zero value data.

9. A digital video signal converting apparatus according to claim 1, wherein said second resolution is higher than said first resolution.

10. A digital video signal converting apparatus according to claim 1, wherein said mapping table represents an average of said blocks of said training signal expressed in said second resolution at said addresses respectively given by said blocks of said training signal in said first resolution.

* * * * *